United States Patent
Kwon

(10) Patent No.: US 7,215,615 B2
(45) Date of Patent: May 8, 2007

(54) MINIMUM DELAY BUFFERING METHOD, MINIMUM DELAY BUFFER DEVICE FOR DYNAMIC WRITE STRATEGY, AND CD-RW/DVD-RW SYSTEM HAVING THE SAME

(75) Inventor: Hyung-joon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 655 days.

(21) Appl. No.: 10/255,335

(22) Filed: Sep. 26, 2002

(65) Prior Publication Data

US 2003/0072232 A1 Apr. 17, 2003

(30) Foreign Application Priority Data

Oct. 16, 2001 (KR) ................................ 2001-63764

(51) Int. Cl.
G11B 7/0045 (2006.01)
(52) U.S. Cl. ................................. 369/47.34
(58) Field of Classification Search ............. 369/47.34, 369/59.24, 59.11
See application file for complete search history.

(56) References Cited

U.S. PATENT DOCUMENTS

| | | | | |
|---|---|---|---|---|
| 4,977,550 A | * | 12/1990 | Furuya et al. | 369/30.23 |
| 5,559,777 A | * | 9/1996 | Maeda et al. | 369/47.5 |
| 6,044,055 A | * | 3/2000 | Hara | 369/116 |
| 6,381,206 B1 | * | 4/2002 | Maeda | 369/59.12 |
| 6,741,531 B2 | * | 5/2004 | Ueki | 369/32.01 |
| 2003/0090971 A1 | * | 5/2003 | Gushima et al. | 369/47.3 |

* cited by examiner

Primary Examiner—Thang V. Tran
Assistant Examiner—Lixi Chow
(74) Attorney, Agent, or Firm—Mills & Onello LLP

(57) ABSTRACT

A pattern buffer apparatus for a dynamic write strategy, which buffers non return to zero (NRZ) data patterns in order to generate a recording pulse in a compact disc system, includes a pattern detector which detects a pattern edge and a pattern from the NRZ data; a write address generating unit which generates a write address indicating a pattern buffer which stores the pattern in response to a write enable signal; the pattern buffer which has a plurality of registers and stores the detected pattern according to the write address; and a read address generating unit which generates a read address in response to a read enable signal, and reads the current pattern stored in the pattern buffer indicated by the read address.

29 Claims, 6 Drawing Sheets

MINIMUM DELAY BUFFERING METHOD, MINIMUM DELAY BUFFER DEVICE FOR DYNAMIC WRITE STRATEGY, AND CD-RW/DVD-RW SYSTEM HAVING THE SAME

BACKGROUND OF THE INVENTION

1. Field of the Invention

The present invention relates to a compact disc (CD) and digital versatile disc (DVD) system, and more particularly, to an apparatus and method for generating a pulse for recording data on an optical disc in a rewritable CD/DVD (hereinafter referred to as "a CD-RW/DVD-RW").

2. Description of the Related Art

Optical discs such as a CD-RW/DVD-RW are used in storing a large amount of audio, video and/or data. A process for recording data on an optical disc includes encoding and modulation. Referring to FIG. 1, the process for recording data on an optical disc will now be described. FIG. 1 shows non return to zero (NRZ) data in a CD-RW/DVD-RW system and a pulse signal for actual recording together with a clock signal.

The CD-RW/DVD-RW system uses an eight-to-fourteen modulation (EFM)/EFM+ method as a modulation method. EFM/EFM+ modulated data is non return to zero inversion (NRZI) data. NRZI data formed of '1' and '0' is converted into NRZ data which is inverted whenever an event (a time when transition from '1' to '0' or from '0' to '1' occurs) occurs. NRZ data has a pattern formed with a mark and a space. Data which is actually recorded on the optical disc is a pulse (WRTE_PULSE) generated based on the mark of NRZ data. A write strategy in the CD-RW/DVD-RW system means how the pulse (WRITE_PULSE) for recording data on the disc is generated.

In the prior art low-speed CD-RW/DVD-RW system, the location and size of a write pulse (WRITE_PULSE) are adjusted only with the size of the current mark (CM). That is, with respect to the size of the current mark, a pulse having a different delay ($T_d$, $T_f$) is generated. Generally, delay information ($T_d$, $T_f$) with respect to the size of a mark is stored in a table in advance, and a write pulse (WRITE_PULSE) is generated by reading delay information corresponding to the size of the current mark (CM).

Recently, in order to enable high speed CD-RW/DVD-RW disc write, a dynamic write strategy has been used. The dynamic write strategy is a technology capable of generating a write pulse considering not only the size of the current mark (CM) but also the sizes of spaces (PS, FS) adjacent to the current mark (CM) and the sizes of marks (PM, FM) adjacent to the current mark (CM).

In an ordinary write strategy, the sizes of a mark and a space are found in an EFM modulated NRZ pattern which is generated and output, and a needed write pulse is generated by reading delay data needed in a corresponding mark. However, in the dynamic write strategy, adjacent marks and spaces should be considered, and buffering of a pattern is needed.

Therefore, an apparatus for pattern buffering is needed. In order to minimize the needed hardware structure and efficiently improve the performances such as the operation speed, a buffering apparatus having a minimum buffering delay and minimum size and a buffering method therefor are needed.

SUMMARY OF THE INVENTION

To solve the above problems, it is a first objective of the present invention to provide a pattern buffering method for buffering the pattern of NRZ data in order to generate a write pulse in a CD-RW/DVD-RW system, the method having a minimum buffering delay and a simplified hardware structure.

It is a second objective of the present invention to provide a pattern buffering apparatus for buffering the pattern of NRZ data in order to generate a write pulse in a CD-RW/DVD-RW system, the apparatus having a minimum buffering delay and minimum structure size.

It is a third objective of the present invention to provide a CD-RW/DVD-RW system having the pattern buffering apparatus.

In accordance with an aspect of the present invention, there is provided a pattern buffering method for a dynamic write strategy, the method for buffering non return to zero (NRZ) data patterns in order to generate a recording pulse in a compact disc-rewritable (CD-RW)/digital versatile disc-rewritable (DVD-RW) system including (a) detecting a pattern edge and a pattern from the NRZ data; (b) generating a write enable signal by delaying the detected pattern edge; (c) generating a write address indicating a pattern buffer to store the detected pattern in response to the write enable signal; (d) writing the detected pattern in the pattern buffer indicated by the write address; (e) generating a read address the same as the write address in response to the read enable signal delayed for a predetermined delay time between a write and a read from the generation of the write enable signal; and (f) reading the current pattern which is stored in the pattern buffer indicated by the read address, one or more patterns which are written before the current pattern, and one or more patterns which are written after the current pattern, in response to the read enable signal.

In accordance with another aspect of the present invention, there is provided a pattern buffering method for a dynamic write strategy, the method for buffering non return to zero (NRZ) data patterns in order to generate a recording pulse in a compact disc-rewritable (CD-RW)/digital versatile disc-rewritable (DVD-RW) system including (a) detecting a pattern edge and a pattern from the NRZ data; (b) generating a write enable signal by delaying the detected pattern edge; (c) generating a write address indicating a pattern buffer to store the detected pattern in response to the write enable signal, the write address which starts from a predetermined start address, increases by 1 to a maximum address, and becomes a minimum address after the maximum address; (d) writing the detected pattern in the pattern buffer indicated by the write address; (e) generating a read address the same as the write address in response to the read enable signal delayed for a predetermined delay time between a write and a read from the generation of the write enable signal; and (f) reading a pattern which is stored in the pattern buffer indicated by the read address, and patterns stored in the pattern buffer indicated by an address which is less than the read address by 1, an address which is less than the read address by 2, an address which is greater than the read address by 1, and an address which is greater than the read address by 2, in response to the read enable signal.

In accordance with still another aspect of the present invention, there is provided a pattern buffer apparatus for a dynamic write strategy, the apparatus which buffers NRZ data patterns in order to generate a recording pulse in a CD-RW/DVD-RW system having a pattern detector which detects a pattern edge and a pattern from the NRZ data; a write address generating unit which generates a write address indicating a pattern buffer which stores the pattern in response to the write enable signal which is generated by delaying the pattern edge; the pattern buffer which has a plurality of registers and stores the detected pattern according to the write address; and a read address generating unit which generates a read address the same as the write address in response to the read enable signal delayed for a predetermined delay time between a write and a read from the generation of the write enable signal, and reads the current pattern which is stored in the pattern buffer indicated by the read address, 2 patterns which are written before the current pattern and continuous immediately before the current pattern, and 2 patterns which are written after the current pattern and continuous immediately after the current pattern.

In accordance with yet another aspect of the present invention, there is provided another method a CD-RW/DVD-RW system having a dynamic write strategy, in which information data is recorded on a CD-RW/DVD-RW by generating a recording pulse from NRZ data which is generated based on the information data, the CD-RW/DVD-RW system having a pattern buffer apparatus which buffers the NRZ data pattern in order to generate the recording pulse, in which the pattern buffer apparatus has a pattern detector which detects a pattern edge and a pattern from the NRZ data; a write address generating unit which generates a write address indicating a pattern buffer which stores the pattern in response to the write enable signal which is generated by delaying the pattern edge; the pattern buffer which has a plurality of registers and stores the detected pattern according to the write address; and a read address generating unit which generates a read address the same as the write address in response to the read enable signal delayed for a predetermined delay time between a write and a read from the generation of the write enable signal, and reads the current pattern which is stored in the pattern buffer indicated by the read address, two patterns which are written before the current pattern and continuous immediately before the current pattern, and two patterns which are written after the current pattern and continuous immediately after the current pattern.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 1:
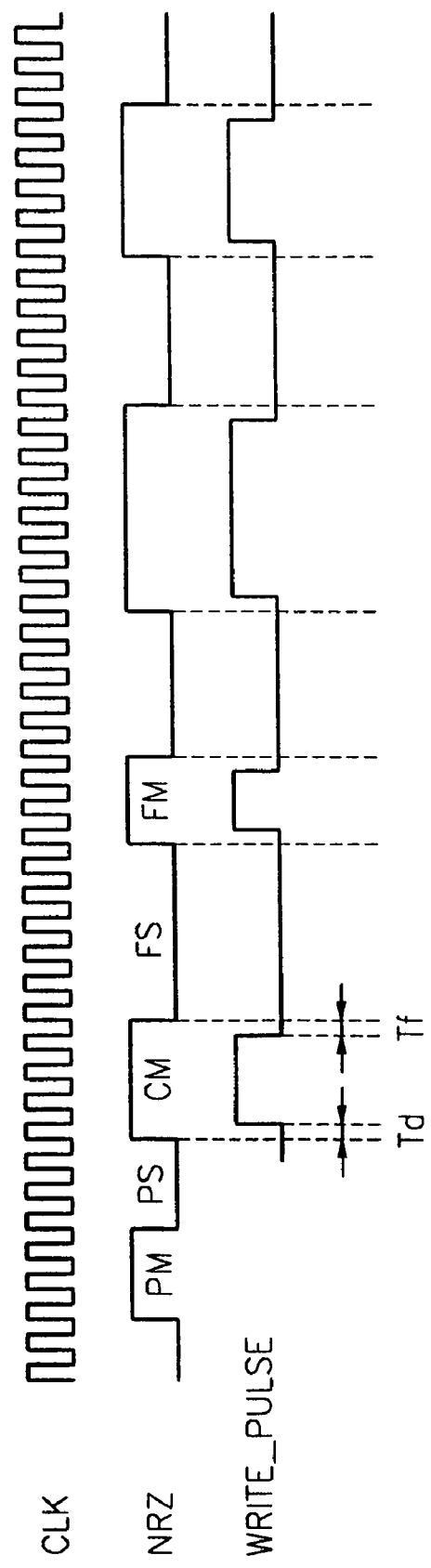
FIG. 1 is a timing diagram of NRZ data in a CD-RW/DVD-RW system, and a pulse signal for recording together with a clock signal.

Before describing the structure of the present invention, the characteristics of NRZ data in a CD-RW/DVD-RW will be described in more detail, referring again to FIG. 1.

Patterns of NRZ data can be divided into a following mark (hereinafter referred to as "FM"), a following space (hereinafter referred to as "FS"), the current mark (hereinafter referred to as "CM"), a previous space (hereinafter referred to as "PS"), and a previous mark (hereinafter referred to as "PM"), centering around the CM.

In order to simultaneously obtain 5 patterns (FM, FS, CM, PS, PM) in continuous NRZ data from a mark at a given time, that is, from the CM, buffering is needed. There are a variety of apparatuses for buffering NRZ data or a variety of hardware for viewing the five patterns at a reference time, but in an encoder, a minimum delay and a minimum size are important.

The present invention provides a pattern buffer apparatus having a minimum size and a minimum delay that satisfy the two purposes, and an operating method therefor.

For reference, NRZ data which is EFM modulated in the CD-RW/DVD-RW system is a run length limited signal having a channel clock width that is between 3 and 11 (3Ts~11Ts, here T is a channel clock cycle). That is, the minimum duration of NRZ data is 3Ts and the maximum duration of NRZ data is 11Ts. In particular, the pattern buffer apparatus and pattern buffering method of the present invention have a minimum size and a minimum delay, using such characteristics of the NRZ data.

Figure 2:
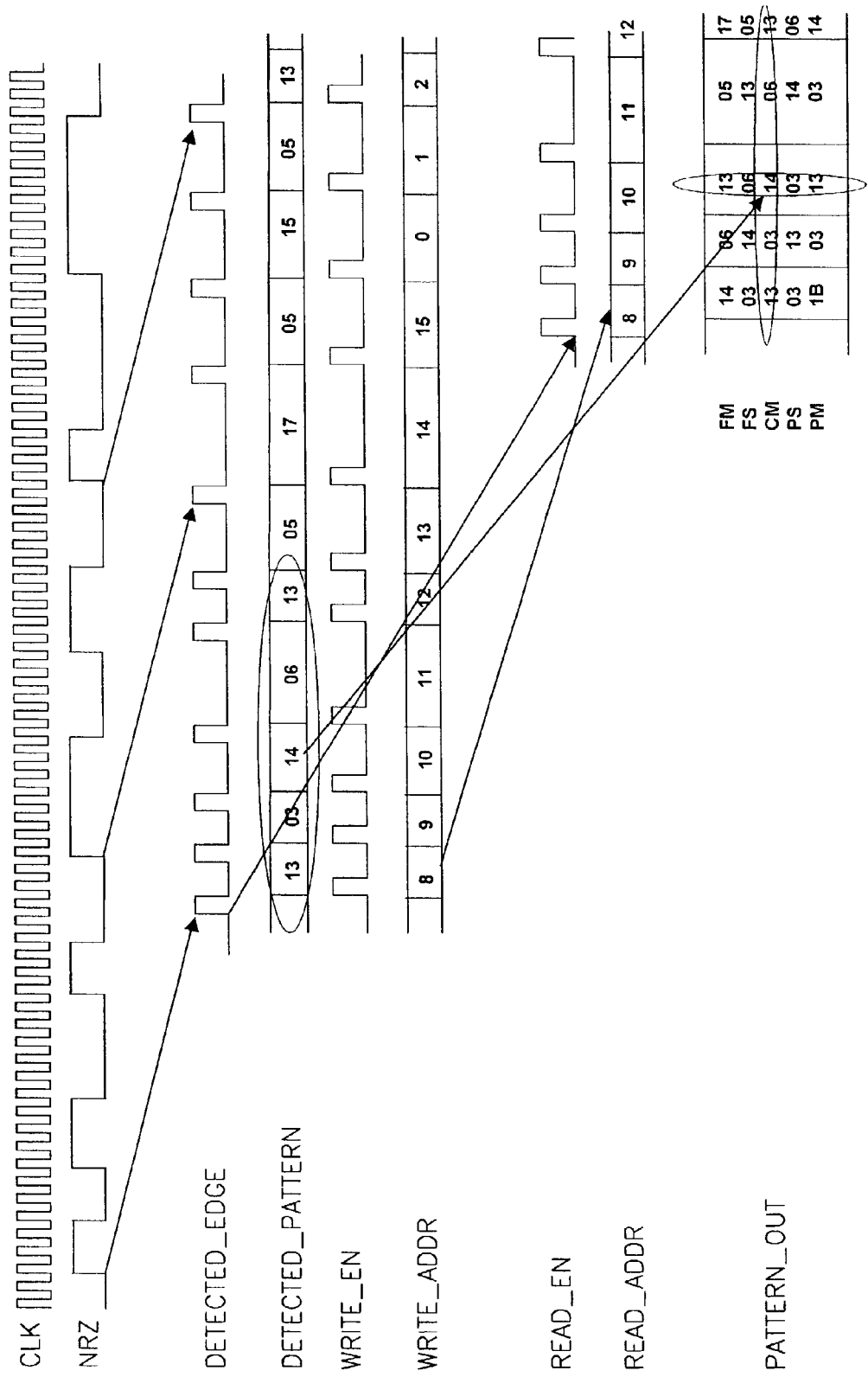
FIG. 2 is a timing diagram of the sequence of a pattern buffering method according to a preferred embodiment of the present invention.

FIG. 2 is a timing diagram of the sequence of a pattern buffering method according to a preferred embodiment of the present invention. The run length of NRZ data synchronized with the channel clock (CLK) is limited between 3Ts and 11Ts. In order to recognize the shape of a pattern from the NRZ data, the NRZ is input to a shift register (not shown). A pattern edge (DETECTED_EDGE) is detected in the shift register, and if the pattern edge (DETECTED_EDGE) is detected, the pattern of serial data can be detected.

The detected patterns (DETECTED_PATTERN) are expressed as '13', '03', '14', and so on, as shown in FIG. 2. The most significant bit '1' or '0' indicates whether the pattern is a mark or a space. If the most significant bit is '1', it indicates a mark, and if the most significant bit is '0', it indicates a space. The four least significant bits indicates the run length of a pattern (DETECTED_PATTERN), that is, the duration. In pattern '13', '3' indicates that the run length is 3Ts, and in pattern '14', '4' indicates that the run length is 4Ts. As described above, EFM modulated NRZ data has a run length between 3Ts and 11Ts. Accordingly, in order to identify a run length, at least 4 bits are needed.

Therefore, if the detected pattern (DETECTED_PATTERN) is '13', it means a mark having a 3T run length, and if the detected pattern is '0A', it means a space having a 10T run length.

The detected pattern edge (DETECTED_EDGE) is delayed for one cycle (1T) of the channel clock (CLK), and then used as a write enable signal (WRITE_EN) for the pattern buffer. Whenever a write enable signal (WRITE_EN) is generated, a write address (WRITE_ADDR) which indicates the address of the pattern buffer in which the detected pattern (DETECTED_PATTERN) is to be written is generated.

The pattern buffer as will be described below is formed with a plurality of registers. Assuming the worst case, the size of the pattern buffer, that is, the number of registers, is determined so that the pattern written in the pattern buffer can be accurately reproduced in any cases. This will also be described later.

A write address (WRITE_ADDR) indicates one of the registers of the pattern buffer. It is preferable that write addresses (WRITE_ADDR) start from a predetermined start address and increase sequentially by 1. Preferably, a minimum address follows a maximum address. Therefore, it is preferable that the pattern buffer be a circular buffer.

The detected pattern (DETECTED_PATTERN) is written in the pattern buffer indicated by the write address (WRITE_ADDR) at a time when the write enable signal (WRITE_EN) is generated. A pattern (DETECTED_PATTERN) which is first detected is written in a register which is indicated by the start address, and a pattern which is detected next is written in the next register of the pattern buffer. Thus, detected patterns (DETECTED_PATTERN) are sequentially written in the registers of the pattern buffer. In FIG. 2, the write addresses (WRITE_ADDR) start from 8 and increase by 1.

Since the delay signal of the detected pattern edge (DETECTED_EDGE) is used as the write enable signal (WRITE_EN), the interval between generations of the write addresses (WRITE_ADDR) of the pattern buffer and the interval between writes of a pattern in the pattern buffer have the same duration as the length of the detected pattern (DETECTED_PATTERN).

Compared to the write enable signal (WRITE_EN), the detected pattern edge (DETECTED_EDGE) is delayed for the delay time between a write and a read, and is used as a read enable signal (READ_EN). The delay time between a write and a read should be determined considering a worst case of the pattern, and the determination method will be explained later. Here, the delay time between a write and a read is 32 channel clocks (32Ts). That is, the read enable signal (READ_EN) is generated 33Ts after the pattern edge (DETECTED_EDGE) and 32Ts after the write enable signal (WRITE_EN).

There is a method in which in order to delay the detected pattern edge (DETECTED_EDGE) for 32 more channel clocks, using 32 flip-flops, each flip-flop is delayed for 1 channel clock and the 32nd output signal is used as the read enable signal (READ_EN).

Whenever the read enable signal (READ_EN) is generated, a read address (READ_ADDR), which indicates an address of the pattern buffer from which a pattern is read, is generated.

Like the write address (WRITE_ADDR), the read addresses start from the same start address as the write address and sequentially increase by 1 whenever the read enable signal (READ_EN) is generated. Therefore, the read addresses (READ_ADDR) are continuously generated as the write addresses with the same interval as the delay time between a write and a read (here, 32Ts).

Accordingly, the pattern which is written in the same address of the pattern buffer is read 32 channel clocks (32Ts) after the generation of the write enable signal (WRITE_EN). That is, the CM which is read in accordance with the read enable signal (READ_EN) which is delayed for 32 channel clocks (32Ts) after the write enable signal (WRITE_EN) is read from the address to which of the pattern buffer the CM is first input. Like the interval between writes, the interval between reads has the same duration as the length of the detected pattern (DETECTED_PATTERN), and therefore the pattern read from the pattern buffer is output as the reproduced pattern of the input pattern.

The pattern stored in the pattern buffer indicated by the read address (READ_ADDR) is read in accordance with the read enable signal (READ_EN), and at the same time patterns stored in the pattern buffer indicated by an address which is less than the read address (READ_ADDR) by 1, an address which is less than the read address (READ_ADDR), by 2, an address which is greater than the read address (READ_ADDR) by 1, and an address which is greater than the read address (READ_ADDR) by 2 are read.

That is, when the CM is read, not only the pattern (CM) indicated by the read address is read, but also the PS and PM which are written before the CM and the CM follows and the FM and FS which are written after the CM and follow the CM are read together. Therefore, centering around the CM, five patterns are reproduced at the same time, and five patterns at a predetermined time can be shown.

Figure 3:
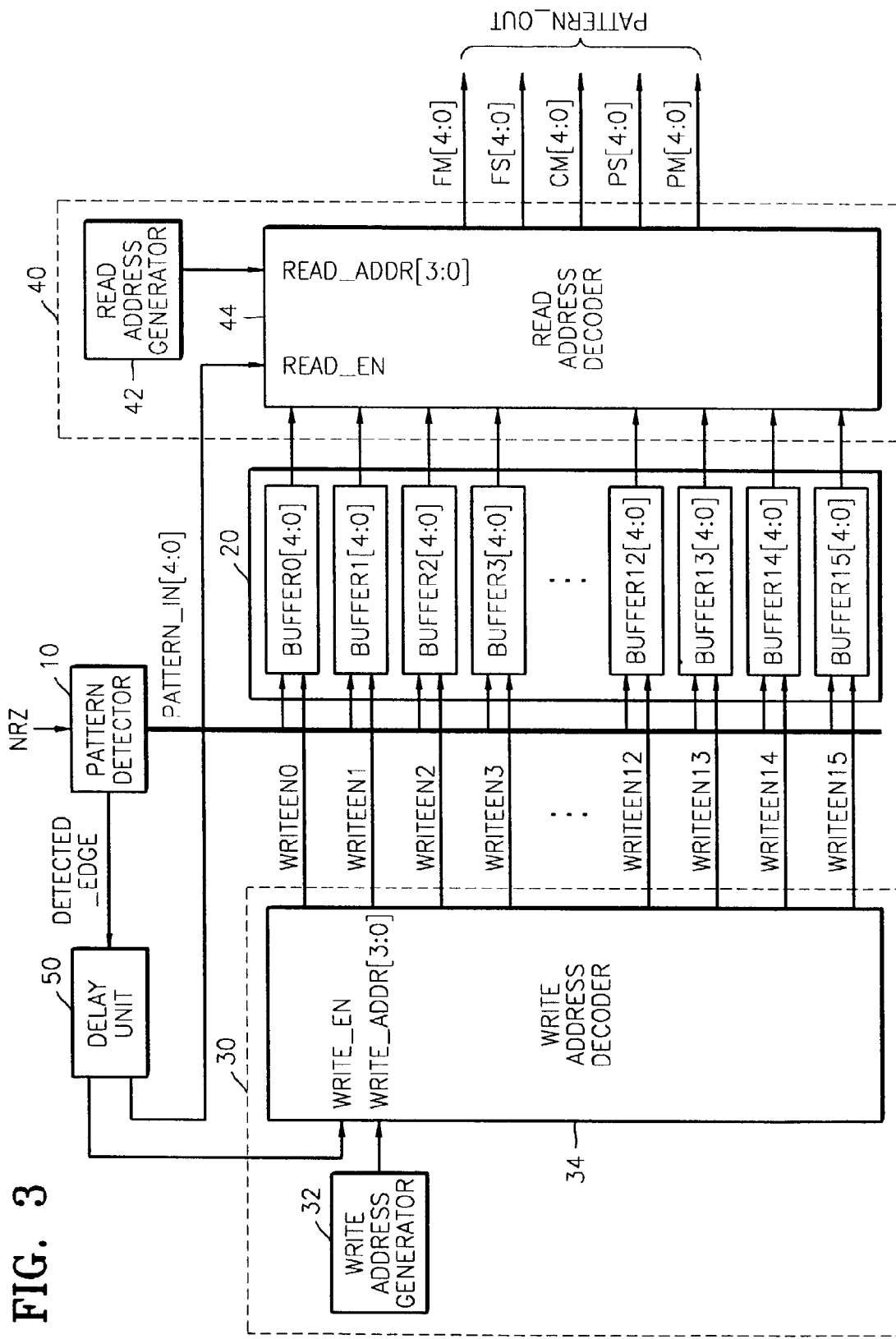
FIG. 3 is a block diagram of a pattern buffer apparatus according to a preferred embodiment of the present invention.

FIG. 3 is a block diagram of a pattern buffer apparatus according to a preferred embodiment of the present invention. Referring to FIG. 3, the pattern buffer apparatus according to a preferred embodiment of the present invention has a pattern detector 10, a pattern buffer 20, a write address generating unit 30, and a read address generating unit 40.

The pattern detector 10 detects a pattern edge (DETECTED_EDGE) and a pattern (DETECTED_PATTERN) from NRZ data. The pattern (PATTERN_IN) which is input to the pattern butter 20 is the pattern (DETECTED_PATTERN) detected in the pattern detector 10.

The pattern buffer 20 is formed with 16 five-bit registers (BUFFER0[4:0]~BUFFER15[4:0]). The reason why the pattern buffer 20 is formed with five-bit registers (BUFFER0 [4:0]~BUFFER15[4:0]) is because at least a total of 5 bits, including 1 bit for determining whether a pattern is a mark or a space and 4 bits for determining the duration of the pattern (PATTERN_IN), are needed to store the pattern (PATTERN_IN) as described above.

Sixteen different write signals (WRITEEN0~WRITEEN15) are input to the registers (BUFFER0~BUFFER15) of the pattern buffer 20, respectively. Each register (BUFFER0~BUFFER15) stores a receiving pattern (PATTERN_IN) when a corresponding write signal is activated.

The write address generating unit 30 includes a write address generator 32 and a write address decoder 34. The write address generator 32 generates an address (WRITE_ADDR) for writing a pattern in the pattern buffer 20 whenever the write enable signal (WRITE_EN) is generated.

The write address decoder 34 decodes the write address (WRITE_ADDR) and specifies one of the registers (BUFFER0~BUFFER15) of the pattern buffer 20. That is, the write address decoder 34 decodes the write address (WRITE_ADDR), selects one of the 16 registers (BUFFER0~BUFFER15), and activates the write signal of the selected register.

The read address generating unit 40 includes a read address generator 42 and a read address decoder 44. The read address generator 42 generates an address (READ_ADDR) for reading a pattern of the pattern buffer 20 whenever the read enable signal (READ_EN) is generated.

The read address decoder 44 decodes the read address (READ_ADDR) generated in the read address generator 42, and multiplexes the pattern (CM) of the register indicated by the read address (READ_ADDR) and adjacent patterns (FM, FS, PS, PM), that is, five patterns (FM, FS, CM, PS, PM) centering around the CM, to generate an external output (PATTERN_OUT).

Since the write address (WRITE_ADDR) and the read address (READ_ADDR) should indicate one of the 16 registers, each of the addresses is formed with 4 bits.

As described above, it is preferable that the write address (WRITE_ADDR) and the read address (READ_ADDR) start from the same start address, and increase sequentially by 1, and the maximum address is followed by the minimum address.

As described above, the write enable signal (WRITE_EN) and the read enable signal (READ_EN) are generated by delaying the detected pattern edge (DETECTED_EDGE). For this, it is preferable that the pattern buffer apparatus of the present invention further include a delay unit 50.

The write enable signal (WRITE_EN) is delayed for 1 channel clock (1T) after the detected pattern edge (DETECTED_EDGE), and the read enable signal (READ_EN) is generated the same interval as the delay time between a write and a read (here, 32Ts) after the write enable signal (WRITE_EN).

Figure 4:
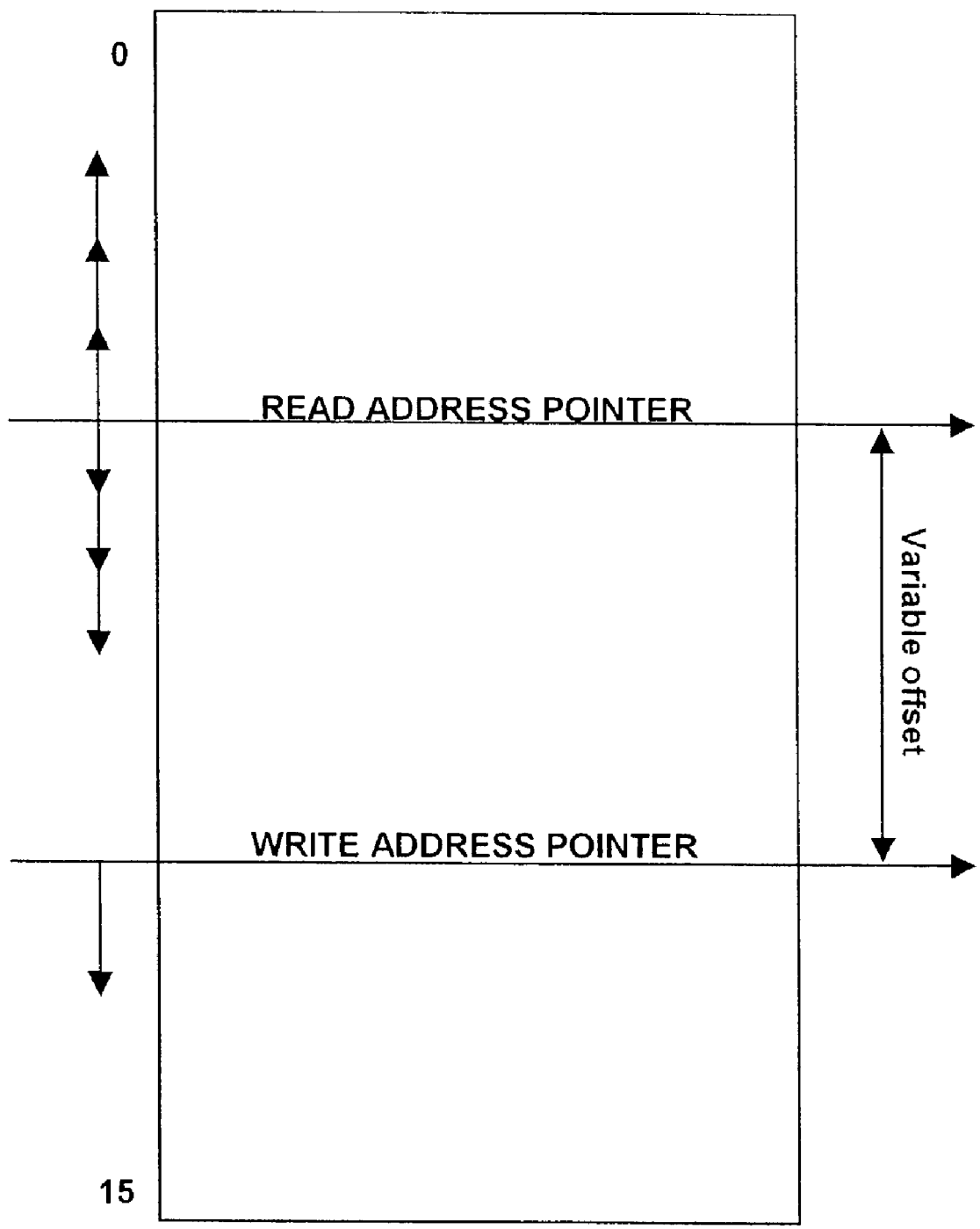
FIG. 4 is a schematic diagram of an address map of a pattern buffer of FIG. 3.

FIG. 4 is a schematic diagram of an address map of the pattern buffer of FIG. 3. The buffer address map is used in describing a method for determining the size of the pattern buffer and the delay time between a write and a read.

Referring to FIG. 4, a write address pointer (WRITE ADDRESS POINTER) which indicates the write address (WRITE_ADDR) increases by 1 at every pattern edge of NRZ data and if the highest address is met, is wrapped around.

A read address pointer (READ ADDRESS POINTER) which indicates the read address (READ_ADDR) should follow the write address pointer, and the offset between the two pointers moves up and down according to the stored pattern and the pattern being reproduced.

Here, it is important that when the length of the pattern being read is short and the length of the pattern being written is long, the read address pointer nears the write address pointer. Therefore, a case where the read address pointer is too fast and a pattern which is not written yet is read should be prevented.

In an opposite case where the length of the pattern being read is long and the length of the pattern being written is short, the write address pointer nears the read address pointer. Therefore, a case where the write address pointer is too fast and invades a pattern which is not read yet should be prevented.

Accordingly, the size of the pattern buffer 20 and the delay time between a write and read should be determined considering the worst case that can take place between the write and read of a pattern.

Figure 5:
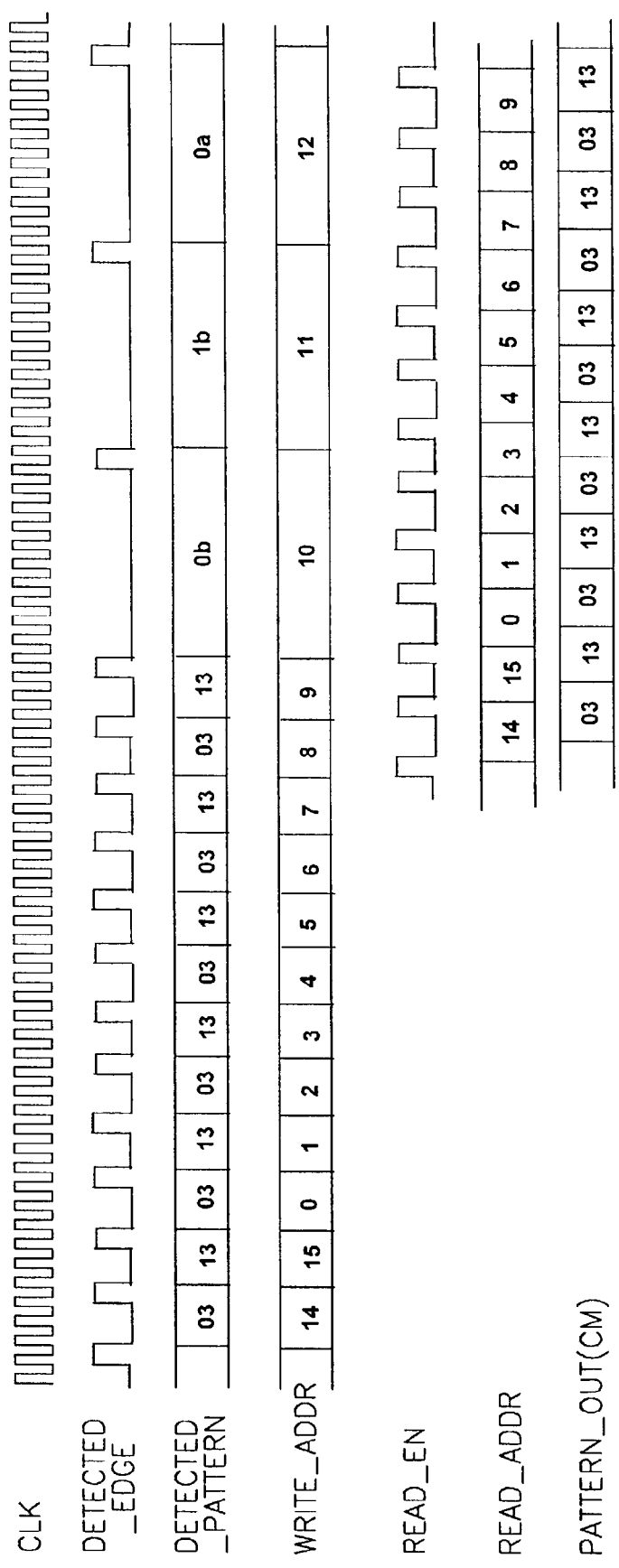
FIG. 5 is a timing diagram of a worst case that can occur between pattern write and read.

FIG. 5 is a timing diagram of a worst case that can occur between pattern write and read. In FIG. 5 the case described above in which the length of the pattern being read is short and the length of the pattern being written is long is shown.

Referring to FIG. 5, in the pattern of NRZ data, a mark ('13') and a space ('030), each having the shortest 3T duration, are continuously appearing at first, and then a space ('0b') and a mark ('1b'), each having a 11T duration, and a space ('0a') having a 10T duration are appearing.

In order to simultaneously read five patterns centering around the CM, reading the patterns should be performed after writing the CM, FS, and FM. That is, since the FM and FS of the CM being read should be protected, it is assumed that the FM, FS, and CM are the patterns having the longest duration, and a delay the same as the longest duration is needed between a write and a read.

In the characteristics of EFM modulated NRZ data, the patterns having '11T+11T+10T' shown in FIG. 5 are the case when the duration of the 3 continuous patterns is the longest, and has the total duration of 32Ts. Therefore, a delay time between a write and a read of at least 32Ts is needed.

As shown in FIG. 5, the worst case is the case where while the continuous 3 patterns ('0b', '1b', '0a') having the longest duration are written, 11 or more patterns, each having the shortest 3T duration, are continuously read. Even in this worst read case, in order to accurately reproduce a written pattern, the size of the pattern buffer should be greater than a predetermined number.

Figure 6:
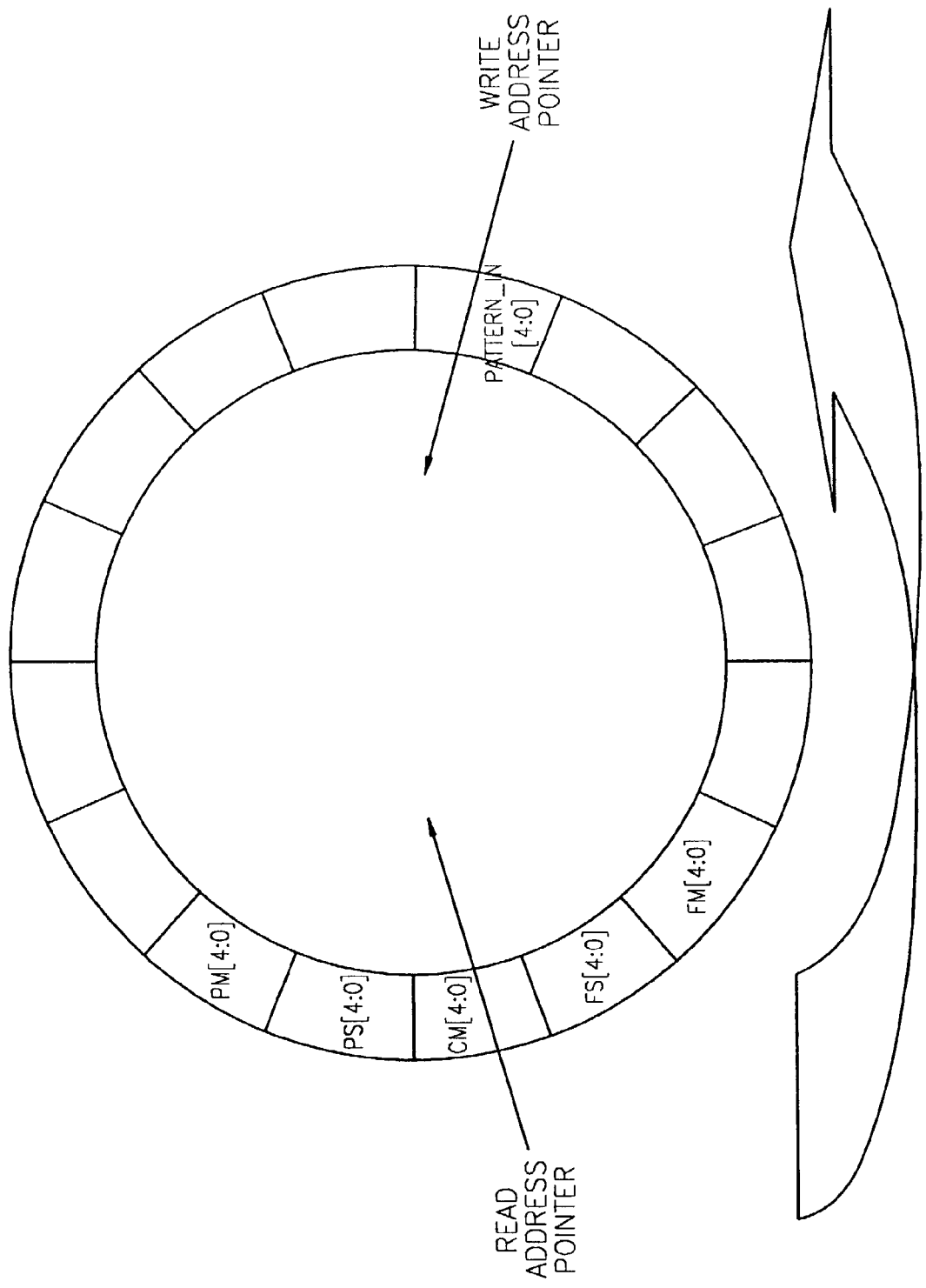
FIG. 6 is a diagram for explaining a buffering mechanism of a pattern according to a preferred embodiment of the present invention.

In order to describe a method for determining the size of the pattern buffer, FIGS. 5 and 6 will be referred to together. FIG. 6 is a diagram illustrating a buffering mechanism of a pattern according to a preferred embodiment of the present invention.

Referring to FIG. 6, as time passes, a write address pointer (WRITE ADDRESS POINTER) and a read address pointer (READ ADDRESS POINTER) move counterclockwise. The difference between the write address pointer and the read address pointer changes with respect to the difference between the write speed and the read speed. The write speed and the read speed are proportional to the duration of the pattern being written and the duration of the pattern being read, respectively.

In FIG. 5, while 3 patterns ('0b', '1b', '0a') are slowly written, reading is quickly performed, and therefore the read address pointer nears the write address pointer and may invade the FM and the FS.

Accordingly, in order to make a read pattern as the complete reproduced pattern of a written pattern in this worst read case, at least 11 registers which can store 11 patterns which are the maximum pattern that can be read when 3 continuous patterns ('0b', '1b', '0a') having the longest durations are written, registers storing the FM and the FS that are to be read together with the CM, and the register in which a pattern is currently written are needed.

Therefore, the size of the pattern buffer should be equal to or greater than 14. That is, the number of registers in the pattern buffer should be at least 14.

On the contrary to FIG. 5, in the worst write case where the writing speed is much faster than the reading speed, the write address pointer nears the read address pointer in FIG. 6, and therefore may invade the PM and the PS of the CM. Accordingly, in order to protect the PM and PS regions in the worst write case, at least 2 patterns from the CM should be protected.

In this worst write case, while 3 continuous patterns ('0b', '1b', '0a') having the longest durations are read, maximum 11 patterns may be written. Therefore, at least 11 registers, registers storing the PM and the PS that are to be read together with the CM, and the register in which a pattern is currently written are needed.

Therefore, the size of the pattern buffer should be equal to or greater than 14 like the worst read case.

In conclusion, considering both the worst read case and the worst write case of 5 patterns to be protected, the size of the pattern buffer should be at least 14.

The pattern buffer 20 in the pattern buffer apparatus according to a preferred embodiment of the present invention shown in FIG. 3 has a total of 16 registers, including 14 registers which is essentially needed, and 2 dummy registers.

While this invention has been particularly shown and described with reference to preferred embodiments thereof, it will be understood by those skilled in the art that various changes in form and details may be made therein without departing from the spirit and scope of the invention as defined by the appended claims.

For example, in the embodiment of the present invention, the delay time between a read and write and the size of the pattern buffer are determined using the characteristics of EFM modulated NRZ data. Therefore, if the characteristics of EFM+ modulated NRZ data is different from the characteristics of EFM modulated NRZ data, then the delay time between a write and a read and the size of the pattern buffer should be determined again. However, the pattern buffering method, The method for determining the delay time between a write and a read and the size of the pattern buffer according to the present invention can be applied without change. Therefore, the scope of the present invention is not determined by the description but by the accompanying claims.

According to the pattern buffering method and pattern buffer apparatus of the present invention, the current pattern and adjacent patterns of NRZ data, which are information needed in generating a recording pulse in a CD-RW/DVD-RW system, can be obtained by a minimum buffering delay and a minimum hardware structure, Also, according to the CD-RW/DVD-RW system having the pattern buffer of the present invention, the hardware structure of the buffer apparatus needed in a dynamic write strategy and a delay needed in buffering are minimized, while the dynamic write strategy is performed effectively.

What is claimed is:

1. A pattern buffering method for a dynamic write strategy, the method for buffering non return to zero (NRZ) data patterns in order to generate a recording pulse in a compact disc-rewritable (CD-RW)/digital versatile disc-rewritable (DVD-RW) system comprising:
   (a) detecting a pattern edge and a pattern from the NRZ data;
   (b) generating a write enable signal by delaying the detected pattern edge;
   (c) generating a write address indicating a pattern buffer to store the detected pattern in response to the write enable signal;
   (d) writing the detected pattern in the pattern buffer indicated by the write address;
   (e) generating a read address the same as the write address in response to a read enable signal, the read enable signal generated by delaying the detected pattern edge and delayed for a predetermined delay time between a write and a read from the generation of the write enable signal, wherein the delay time between the write and the read is determined as a time equal to or longer than the duration when three continuous patterns have the longest duration; and
   (f) reading the current pattern which is stored in the pattern buffer indicated by the read address, one or more patterns which are written before the current pattern, and one or more patterns which are written after the current pattern, in response to the read enable signal.

2. The pattern buffering method of claim 1, wherein the patterns read in step (f) are two patterns which are written before the current pattern and continuous immediately before the current pattern and two patterns which are written after the current pattern and continuous immediately after the current pattern.

3. A pattern buffering method for a dynamic write strategy, the method for buffering non return to zero (NRZ) data patterns in order to generate a recording pulse in a compact disc-rewritable (CD-RW)/digital versatile disc-rewritable (DVD-RW) system comprising:
   (a) detecting a pattern edge and a pattern from the NRZ data;
   (b) generating a write enable signal by delaying the detected pattern edge
   (c) generating a write address indicating a pattern buffer to store the detected pattern in response to the write enable signal, the write address which starts from a predetermined start address, increases by 1 to a maximum address, and becomes a minimum address after the maximum address;
   (d) writing the detected pattern in the pattern buffer indicated by the write address;
   (e) generating a read address the same as the write address in response to a read enable signal, the read enable signal generated by delaying the detected pattern edge and delayed for a predetermined delay time between a write and a read from the generation of the write enable signal, wherein the delay time between the write and the read is determined as a time equal to or longer than the duration when three continuous patterns have the longest duration; and
   (f) reading a pattern which is stored in the pattern buffer indicated by the read address, and patterns stored in the pattern buffer indicated by an address which is less than the read address by 1, an address which is less than the read address by 2, an address which is greater than the read address by 1, and an address which is greater than the read address by 2, in response to the read enable signal.

4. The pattern buffering method of claim 3, wherein the delay time between a write and a read is the same as 32 channel clocks.

5. The pattern buffering method of claim 3, wherein the write enable signal of step (b) is generated after being delayed for one channel clock from the detected pattern edge.

6. The pattern buffering method of claim 3, wherein the size of the pattern buffer is determined as a number which is obtained by adding at least 3 to the maximum number of patterns that are read during a time when three continuous patterns having the longest duration are written, or as a number which is obtained by adding at least 3 to the maximum number of patterns that are written during a time when three continuous patterns having the longest duration are read.

7. A pattern buffer apparatus for a dynamic write strategy, the apparatus which buffers non return to zero (NRZ) data patterns in order to generate a recording pulse in a compact disc-rewritable (CD-RW)/digital versatile disc-rewritable (DVD-RW) system comprising:
   a pattern detector which detects a pattern edge and a pattern from the NRZ data;
   a write address generating unit which generates a write address indicating a pattern buffer which stores the pattern in response to a write enable signal which is generated by delaying the pattern edge;
   the pattern buffer which has a plurality of registers and stores the detected pattern according to the write address; and a read address generating unit which generates a read address the same as the write address in response to a read enable signal, the read enable signal generated by delaying the detected pattern edge and delayed for a predetermined delay time between a write and a read from the generation of the write enable signal, wherein the delay time between the write and the read is determined as a time equal to or longer than the duration when three continuous patterns have the longest duration, and wherein the read address generating unit reads the current pattern which is stored in the pattern buffer indicated by the read address, two patterns which are written before the current pattern and continuous immediately before the current pattern, and two patterns which are written after the current pattern and continuous immediately after the current pattern.

8. The pattern buffer apparatus of claim 7, wherein the write address generating unit comprises:
 a write address generator which, whenever the write enable signal is generated, generates the write address which starts from a predetermined start address, increases by 1 to a maximum address, and becomes a minimum address after the maximum address; and
 a write address decoder which decodes the write address to activate a write signal which is input to a register of the pattern buffer indicated by the write address.

9. The pattern buffer apparatus of claim 8, wherein the read address generating unit comprises:
 a read address generator which, whenever the read enable signal is generated, generates the read address which starts from the start address, increases by 1 to a maximum address, and becomes a minimum address after the maximum address; and
 a read address decoder which decodes the write address and selects and reads a pattern which is stored in a register of the pattern buffer indicated by the read address, and patterns stored in registers of the pattern buffer indicated by an address which is less than the read address by 1, an address which is less than the read address by 2, an address which is greater than the read address by 1, and an address which is greater than the read address by 2.

10. The pattern buffer apparatus of claim 7, wherein the delay time between the write and the read is the same as 32 channel clocks.

11. The pattern buffer apparatus of claim 7, wherein the write enable signal is generated after being delayed for one channel clock from the pattern edge.

12. The pattern buffer apparatus of claim 7, wherein the size of the pattern buffer is a number which is obtained by adding at least 3 to the maximum number of patterns that are read during a time when three continuous patterns having the longest duration are written, or a number which is obtained by adding at least 3 to the maximum number of patterns that are written during a time when three continuous patterns having the longest duration are read.

13. The pattern buffer apparatus of claim 12, wherein the pattern buffer comprises at least 14 registers.

14. The pattern buffer apparatus of claim 12, wherein the size of the pattern buffer is 16 registers.

15. A compact disc-rewritable (CD-RW)/digital versatile disc-rewritable (DVD-RW) system having a dynamic write strategy, in which information data is recorded on a CD-RW/DVD-RW by generating a recording pulse from non return to zero (NRZ) data which is generated based on the information data, the CD-RW/DVD-RW system having a pattern buffer apparatus which buffers the NRZ data pattern in order to generate the recording pulse, wherein the pattern buffer apparatus comprises:
 a pattern detector which detects a pattern edge and a pattern from the NRZ data;
 a write address generating unit which generates a write address indicating a pattern buffer which stores the pattern in response to a write enable signal which is generated by delaying the pattern edge
 the pattern buffer which has a plurality of registers and stores the detected pattern according to the write address; and
 a read address generating unit which generates a read address the same as the write address in response to a read enable signal, the read enable signal generated delaying the detected pattern edge and delayed for a predetermined delay time between a write and a read from the generation of the write enable signal, wherein the delay time between the write and the read is determined as a time equal to or longer than the duration when three continuous patterns have the longest duration, and wherein the read address generating unit reads the current pattern which is stored in the pattern buffer indicated by the read address, two patterns which are written before the current pattern and continuous immediately before the current pattern, and two patterns which are written after the current pattern and continuous immediately after the current pattern.

16. The CD-RW/DVD-RW system of claim 15, wherein the write address generating unit comprises:
 a write address generator which, whenever the write enable signal is generated, generates the write address which starts from a predetermined start address, increases by 1 to a maximum address, and becomes a minimum address after the maximum address; and
 a write address decoder which decodes the write address to activate a write signal which is input to a register of the pattern buffer indicated by the write address.

17. The CD-RW/DVD-RW system of claim 16, wherein the read address generating unit comprises:
 a read address generator which, whenever the read enable signal is generated, generates the read address which starts from the start address, increases by 1 to a maximum address, and becomes a minimum address after the maximum address; and
 a read address decoder which decodes the write address and selects and reads a pattern which is stored in a register of the pattern buffer indicated by the read address, and patterns stored in registers of the pattern buffer indicated by an address which is less than the read address by 1, an address which is less than the read address by 2, an address which is greater than the read address by 1, and an address which is greater than the read address by 2.

18. The CD-RW/DVD-RW system of claim 15, wherein the size of the pattern buffer is a number which is obtained by adding at least 3 to the maximum number of patterns that are read during a time when three continuous patterns having the longest duration are written, or a number which is obtained by adding at least 3 to the maximum number of patterns that are written during a time when three continuous patterns having the longest duration are read.

19. A pattern buffering method for a dynamic write strategy, the method for buffering non return to zero (NRZ) data patterns in order to generate a recording pulse in a compact disc-rewritable (CD-RW)/digital versatile disc-rewritable (DVD-RW) system comprising:

(a) detecting a pattern edge and a pattern from the NRZ data;
(b) generating a write enable signal by delaying the detected pattern edge;
(c) generating a write address indicating a pattern buffer to store the detected pattern in response to the write enable signal, the write address which starts from a predetermined start address, increases by 1 to a maximum address, and becomes a minimum address after the maximum address;
(d) writing the detected pattern in the pattern buffer indicated by the write address;
(e) generating a read address the same as the write address in response to a read enable signal delayed for a predetermined delay time between a write and a read from the generation of the write enable signal; and
(f) reading a pattern which is stored in the pattern buffer indicated by the read address, and patterns stored in the pattern buffer indicated by an address which is less than the read address by 1, an address which is less than the read address by 2, an address which is greater than the read address by 1, and an address which is greater than the read address by 2, in response to the read enable signal, wherein the delay time between the write and the read is determined as a time equal to or longer than the duration when three continuous patterns have the longest duration.

20. The pattern buffering method of claim 19, wherein the delay time between a write and a read is the same as 32 channel clocks.

21. A pattern buffering method for a dynamic write strategy, the method for buffering non return to zero (NRZ) data patterns in order to generate a recording pulse in a compact disc-rewritable (CD-RW)/digital versatile disc-rewritable (DVD-RW) system comprising:
(a) detecting a pattern edge and a pattern from the NRZ data;
(b) generating a write enable signal by delaying the detected pattern edge;
(c) generating a write address indicating a pattern buffer to store the detected pattern in response to the write enable signal, the write address which starts from a predetermined start address, increases by 1 to a maximum address, and becomes a minimum address after the maximum address;
(d) writing the detected pattern in the pattern buffer indicated by the write address;
(e) generating a read address the same as the write address in response to a read enable signal delayed for a predetermined delay time between a write and a read from the generation of the write enable signal; and
(f) reading a pattern which is stored in the pattern buffer indicated by the read address, and patterns stored in the pattern buffer indicated by an address which is less than the read address by 1, an address which is less than the read address by 2, an address which is greater than the read address by 1, and an address which is greater than the read address by 2, in response to the read enable signal, wherein the size of the pattern buffer is determined as a number which is obtained by adding at least 3 to the maximum number of patterns that are read during a time when three continuous patterns having the longest duration are written, or as a number which is obtained by adding at least 3 to the maximum number of patterns that are written during a time when three continuous patterns having the longest duration are read.

22. A pattern buffer apparatus for a dynamic write strategy, the apparatus which buffers non return to zero (NRZ) data patterns in order to generate a recording pulse in a compact disc-rewritable (CD-RW)/digital versatile disc-rewritable (DVD-RW) system comprising:
a pattern detector which detects a pattern edge and a pattern from the NRZ data;
a write address generating unit which generates a write address indicating a pattern buffer which stores the pattern in response to a write enable signal which is generated by delaying the pattern edge;
the pattern buffer which has a plurality of registers and stores the detected pattern according to the write address; and
a read address generating unit which generates a read address the same as the write address in response to a read enable signal delayed for a predetermined delay time between a write and a read from the generation of the write enable signal, and reads the current pattern which is stored in the pattern buffer indicated by the read address, two patterns which are written before the current pattern and continuous immediately before the current pattern, and two patterns which are written after the current pattern and continuous immediately after the current pattern, wherein the delay time between a write and a read is determined as a time equal to or longer than the duration when three continuous patterns have the longest duration.

23. The pattern buffer apparatus of claim 22, wherein the delay time between a write and a read is the same as 32 channel clocks.

24. A pattern buffer apparatus for a dynamic write strategy, the apparatus which buffers non return to zero (NRZ) data patterns in order to generate a recording pulse in a compact disc-rewritable (CD-RW)/digital versatile disc-rewritable (DVD-RW) system comprising:
a pattern detector which detects a pattern edge and a pattern from the NIRZ data;
a write address generating unit which generates a write address indicating a pattern buffer which stores the pattern in response to a write enable signal which is generated by delaying the pattern edge;
the pattern buffer which has a plurality of registers and stores the detected pattern according to the write address; and
a read address generating unit which generates a read address the same as the write address in response to a read enable signal delayed for a predetermined delay time between a write and a read from the generation of the write enable signal, and reads the current pattern which is stored in the pattern buffer indicated by the read address, two patterns which are written before the current pattern and continuous immediately before the current pattern, and two patterns which are written after the current pattern and continuous immediately after the current pattern, wherein the size of the pattern buffer is a number which is obtained by adding at least 3 to the maximum number of patterns that are read during a time when three continuous patterns having the longest duration are written, or a number which is obtained by adding at least 3 to the maximum number of patterns that are written during a time when three continuous patterns having the longest duration are read.

25. The pattern buffer apparatus of claim 24, wherein the pattern buffer comprises at least 14 registers.

26. The pattern buffer apparatus of claim 24, wherein the size of the pattern buffer is 16 registers.

27. A compact disc-rewritable (CD-RW)/digital versatile disc-rewritable (DVD-RW) system having a dynamic write strategy, in which information data is recorded on a CD-RW/ DVD-RW by generating a recording pulse from non return to zero (NRZ) data which is generated based on the information data, the CD-RW/DVD-RW system having a pattern buffer apparatus which buffers the NRZ data pattern in order to generate the recording pulse, wherein the pattern buffer apparatus comprises:
- a pattern detector which detects a pattern edge and a pattern from the NRZ data;
- a write address generating unit which generates a write address indicating a pattern buffer which stores the pattern in response to a write enable signal which is generated by delaying the pattern edge;
- the pattern buffer which has a plurality of registers and stores the detected pattern according to the write address; and
- a read address generating unit which generates a read address the same as the write address in response to a read enable signal delayed for a predetermined delay time between a write and a read from the generation of the write enable signal, and reads the current pattern which is stored in the pattern buffer indicated by the read address, two patterns which are written before the current pattern and continuous immediately before the current pattern, and two patterns which are written after the current pattern and continuous immediately after the current pattern, wherein the delay time between a write and a read is determined as a time equal to or longer than the duration when three continuous patterns has the longest duration.

28. A compact disc-rewritable (CD-RW)/digital versatile disc-rewritable (DVD-RW) system having a dynamic write strategy, in which information data is recorded on a CD-RW/ DVD-RW by generating a recording pulse from non return to zero (NRZ) data which is generated based on the information data, the CD-RW/DVD-RW system having a pattern buffer apparatus which buffers the NRZ data pattern in order to generate the recording pulse, wherein the pattern buffer apparatus comprises:
- a pattern detector which detects a pattern edge and a pattern from the NRZ data;
- a write address generating unit which generates a write address indicating a pattern buffer which stores the pattern in response to a write enable signal which is generated by delaying the pattern edge;
- the pattern buffer which has a plurality of registers and stores the detected pattern according to the write address; and
- a read address generating unit which generates a read address the same as the write address in response to a read enable signal delayed for a predetermined delay time between a write and a read from the generation of the write enable signal, and reads the current pattern which is stored in the pattern buffer indicated by the read address, two patterns which are written before the current pattern and continuous immediately before the current pattern, and two patterns which are written after the current pattern and continuous immediately after the current pattern, wherein the size of the pattern buffer is a number which is obtained by adding at least 3 to the maximum number of patterns that are read during a time when three continuous patterns having the longest duration are written, or a number which is obtained by adding at least 3 to the maximum number of patterns that are written during a time when three continuous patterns having the longest duration are read.

29. A pattern buffering method for a dynamic write strategy, the method for buffering non return to zero (NRZ) data patterns in order to generate a recording pulse in a compact disc-rewritable (CD-RW)/digital versatile disc-rewritable (DVD-RW) system comprising:
- (a) detecting a pattern edge and a pattern from the NRZ data;
- (b) generating a write enable signal by delaying the detected pattern edge;
- (c) generating a write address indicating a pattern buffer to store the detected pattern in response to the write enable signal, the write address which starts from a predetermined start address, increases by 1 to a maximum address, and becomes a minimum address after the maximum address;
- (d) writing the detected pattern in the pattern buffer indicated by the write address;
- (e) generating a read address the same as the write address in response to a read enable signal, the read enable signal generated by delaying the detected pattern edge and delayed for a predetermined delay time between a write and a read from the generation of the write enable signal; and
- (f) reading a pattern which is stored in the pattern buffer indicated by the read address, and patterns stored in the pattern buffer indicated by an address which is less than the read address by 1, an address which is less than the read address by 2, an address which is greater than the read address by 1, and an address which is greater than the read address by 2, in response to the read enable signal, wherein the size of the pattern buffer is determined as a number which is obtained by adding at least 3 to the maximum number of patterns that are read during a time when three continuous patterns having the longest duration are written, or as a number which is obtained by adding at least 3 to the maximum number of patterns that are written during a time when three continuous patterns having the longest duration are read.

* * * * *

UNITED STATES PATENT AND TRADEMARK OFFICE
CERTIFICATE OF CORRECTION

PATENT NO. : 7,215,615 B2 Page 1 of 1
APPLICATION NO. : 10/255335
DATED : May 8, 2007
INVENTOR(S) : Hyung-joon Kwon It is certified that error appears in the above-identified patent and that said Letters Patent is hereby corrected as shown below:

Column 14, line 39 delete "NIRZ" and insert --NRZ--

Signed and Sealed this

Ninth Day of October, 2007

JON W. DUDAS
*Director of the United States Patent and Trademark Office*